US010279558B2

(12) United States Patent
Tokiwa et al.

(10) Patent No.: US 10,279,558 B2
(45) Date of Patent: May 7, 2019

(54) METHOD FOR PRODUCING SKIN-COVERED FOAMED MOLDED ARTICLE AND APPARATUS FOR PRODUCING THEREOF

(71) Applicant: JSP CORPORATION, Tokyo (JP)

(72) Inventors: Tomoo Tokiwa, Kanuma (JP); Masahiro Gomibuchi, Shimotsuke (JP); Daisuke Imanari, Rochester, MI (US)

(73) Assignee: JSP CORPORATION, Tokyo (JP)

( * ) Notice: Subject to any disclaimer, the term of this patent is extended or adjusted under 35 U.S.C. 154(b) by 489 days.

(21) Appl. No.: 13/735,375

(22) Filed: Jan. 7, 2013

(65) Prior Publication Data
US 2013/0175725 A1 Jul. 11, 2013

(30) Foreign Application Priority Data
Jan. 11, 2012 (JP) ................................. 2012-002752

(51) Int. Cl.
*B29C 49/04* (2006.01)
*B29C 44/34* (2006.01)
*B29C 44/14* (2006.01)
*B32B 1/02* (2006.01)
(Continued)

(52) U.S. Cl.
CPC .............. *B32B 1/02* (2013.01); *B29C 44/146* (2013.01); *B29C 44/18* (2013.01); *B29C 44/343* (2013.01);
(Continued)

(58) Field of Classification Search
CPC ....... B29C 44/146; B29C 44/16; B29C 44/18; B29C 44/3461; B29C 2049/5837;
(Continued)

(56) References Cited

U.S. PATENT DOCUMENTS 5,863,489 A * 1/1999 Flood ...................... B29C 49/60
264/504
6,375,891 B1 * 4/2002 Nishikawa .............. B29C 49/50
264/155
(Continued)

FOREIGN PATENT DOCUMENTS

JP 57135125 A * 8/1982 ............. B29C 44/18
JP A-06-182887 7/1994
(Continued)

OTHER PUBLICATIONS

May 6, 2013 Extended European Search Report issued in European Patent Application No. EP 13150662.8.

*Primary Examiner* — Jeffrey M Wollschlager
*Assistant Examiner* — Armand Melendez
(74) *Attorney, Agent, or Firm* — Oliff PLC (57) ABSTRACT

A method for producing a skin-covered foamed molded article including blow-molding a parison in a mold cavity to form a skin consisting of a hollow molded body, in which the parison is in a softened state by extruding a molten thermoplastic resin, filling expanded beads in the hollow molded body, and heating and fusion bonding the beads by supplying steam via a steam supply pipe inserted into the hollow molded body. The parison is in contact with a protruding portion, formed by protrusion from an inner surface of the mold cavity to an inside of the cavity, forming a recessed portion having a shape corresponding to the protruding portion in the inward direction of the hollow molded body. A steam hole is formed in the recessed portion, a steam supply pipe is inserted into the body, and the expanded beads are heated and fusion bonded by supplying steam.

5 Claims, 7 Drawing Sheets

(51) Int. Cl.
*B29C 44/18* (2006.01)
*B29C 49/46* (2006.01)
*B29C 49/58* (2006.01)

(52) U.S. Cl.
CPC .......... *B29C 44/3461* (2013.01); *B29C 49/46* (2013.01); *B29C 49/04* (2013.01); *B29C 2049/4667* (2013.01); *B29C 2049/5837* (2013.01)

(58) Field of Classification Search
CPC ... B29C 49/04; B29C 2049/384; B29C 44/14; B29C 44/143; B29C 44/38; B29C 44/58; B29C 44/582; B29C 44/583; B29C 44/3415; B29C 44/3426; B29C 44/343
USPC ...... 156/78; 264/45.4, 51, DIG. 1, 46.4, 454
See application file for complete search history.

(56) References Cited

U.S. PATENT DOCUMENTS

| | | | |
|---|---|---|---|
| 8,221,876 B2 | 7/2012 | Tokiwa et al. | |
| 2008/0275148 A1* | 11/2008 | Tokiwa | B29C 44/14 521/51 |

FOREIGN PATENT DOCUMENTS

| | | |
|---|---|---|
| JP | A-7-195536 | 8/1995 |
| JP | A-8-155999 | 6/1996 |
| JP | 2770121 B2 | 4/1998 |
| JP | 3400327 B2 | 2/2003 |
| JP | 2008-142990 A | 6/2008 |
| JP | A-2008-273117 | 11/2008 |

* cited by examiner

METHOD FOR PRODUCING SKIN-COVERED FOAMED MOLDED ARTICLE AND APPARATUS FOR PRODUCING THEREOF

BACKGROUND OF THE INVENTION

Technical Field

The present invention relates to a method for producing a skin-covered foamed molded article and an apparatus for producing thereof.

Related Art

It has hitherto known that a method of producing a skin-covered foamed molded article includes placing a parison in a mold cavity for molding, forming a hollow molded body by blow molding, filling expanded beads (i.e., foamed particles) in the hollow molded body, and heating and fusion bonding the expanded beads with steam.

When a skin-covered foamed molded article is produced by the aforementioned method, as a method of improving a fusion bonding property between the hollow molded body and expanded beads, JP 6-182887 A discloses a molding method including placing a parison in softened state in a mold cavity for molding, blowing air into the parison to give a hollow molded body, performing a process for forming a filling hole on the hollow molded body before cooling and solidification of the hollow molded body, filling the expanded beads in the hollow molded body through the filling hole, and heating and fusion bonding them. Further, JP 2008-273117 A discloses a skin-covered polypropylene resin foamed molded article with improved fusion bonding property between the skin and expanded beads, in which a specific polypropylene resin is used as a resin for forming the skin.

SUMMARY OF THE INVENTION

According to conventional methods, a tubular steam pin with sharp tip is inserted into a hollow molded body in softened state before cooling and solidification of the hollow molded body to form a skin. By doing so, a steam supply hole (also referred to as a "hole for inserting a steam supply pipe" or "steam feeding hole") is formed, and when heated steam is blown through the steam pin into a hollow molded body, expanded beads are heated and fusion bonded.

However, for a case in which a base resin of the hollow molded body for forming a skin is a resin such as a thermoplastic resin which shows plasticity under heating, if steam is not supplied for a long period of time for steam supply through the steam pin, fusion bonding between expanded beads may be insufficient, or adhesion between the expanded beads and the skin may become insufficient. Thus, in order to obtain a skin-covered foamed molded article which is excellent in fusion bonding between the expanded beads, adhesion between the expanded beads and skin, bending strength, or the like, a long molding cycle is inevitably needed and it remains as a problem in production.

Figure 7:
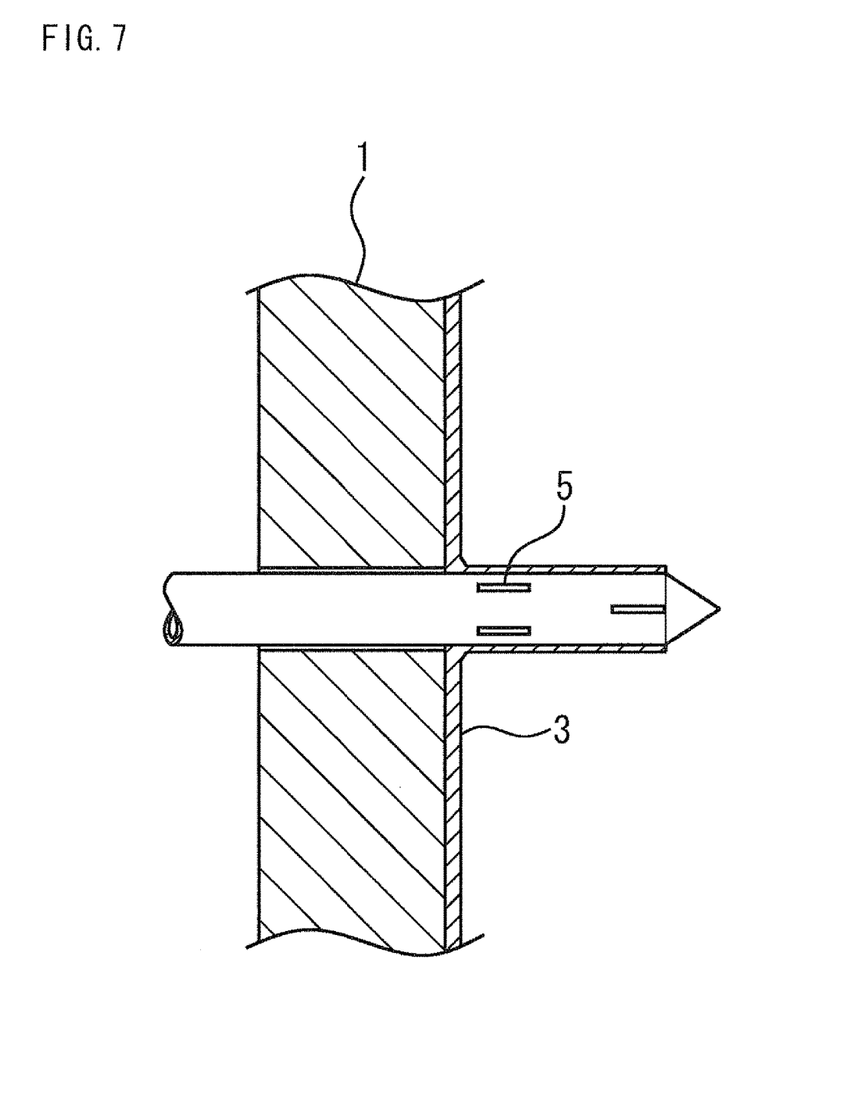
FIG. 7 is a partially enlarged view illustrating diagrammatically the lengthwise cross-section illustrating a state in which the resin for forming the hollow molded body is stretched according to insertion of a conventional steam pin.

In this regard, the inventors of the present invention found that an occurrence of poor fusion bonding between the expanded beads or a need for extended molding cycle as mentioned above according to conventional methods involving supplying steam through a steam pin is due to the fact that, when a steam hole is formed by inserting a steam pin into a hollow molded body, the resin used for forming a hollow molded body is either adhered to outer wall of a steam pin or stretched along the steam pin, for example, as schematically illustrated in FIG. 7 (reference drawing), drawn into the inside of the hollow molded body, and solidified near the outer wall of the steam pin, and consequently inhibits sufficient steam supply from the steam pin.

Under the circumstances, the inventors of the present invention conducted intensive and multilateral studies about a method of forming a steam feeding hole in a hollow molded body using a steam pin, shape of a steam pin, or the like, and as a result, succeed in solving the aforementioned problems based on the production method and the apparatus for producing a foamed molded article having the constitution to be described below.

With regard to a method of producing a skin-covered foamed molded article, an object of the invention is to provide a method of producing a skin-covered foamed molded article which has good fusion bonding between expanded beads and good fusion bonding between the expanded beads and skin even without requiring a long molding cycle time, and an apparatus for producing a skin-covered foamed molded article.

Specifically, the following (1) to (7) are the gist of the invention.

(1) A method for producing a skin-covered foamed molded article, the method comprising blow-molding a parison in a mold cavity to form a hollow molded body to be a skin, in which the parison is in softened state as formed by extruding a molten thermoplastic resin using an extruder, filling the thermoplastic resin expanded beads in the hollow molded body, and heating and fusion bonding the expanded beads by supplying steam via a steam supply pipe inserted into the hollow molded body, wherein the parison is in contact with the protruding portion which is formed by protrusion from inner surface of the mold cavity inside of the cavity, to form a recessed portion having a shape corresponding to the shape of protruding portion in the inward direction of the hollow molded body, a hole for inserting a steam supply pipe is formed in the recessed portion, the steam supply pipe is inserted into the hollow molded body, and the expanded beads are heated and fusion bonded by supplying steam from the steam supply pipe inserted into the hollow molded body.

(2) The method for producing a skin-covered foamed molded article described in the above (1), in which the protruding portion is formed by an outer pipe which covers the steam supply pipe and the steam supply pipe is provided along inner side of the outer pipe such that it can be inserted and pass through the recessed portion of the hollow molded body.

(3) The method for producing a skin-covered foamed molded article described in the above (2), in which the steam supply pipe is a hollow cylinder body with closed tip, the tip has a shape of recessed shape, flat shape, or protruded shape, and a plurality of slits for supplying steam are formed on the peripheral wall of the steam supply pipe.

(4) The method for producing a skin-covered foamed molded article described in the above (2), in which the parison is made from a polyolefin resin.

(5) An apparatus for producing a skin-covered foamed molded article, the apparatus including a mold for forming a hollow molded body by blow molding a parison in softened state, a steam supply pipe, and an outer pipe for covering the steam supply pipe, in which the outer pipe is protruded from the inner surface of the mold into the mold cavity, and the steam supply pipe is provided along inner side of the outer pipe such that it can protrude from the tip of the outer pipe into the mold cavity.

(6) The apparatus for producing a skin-covered foamed molded article described in the above (5), in which the tip of the steam supply pipe has a shape of recessed shape, flat shape, or protruded shape, the tip is closed, and a plurality of slits for supplying steam are formed on the peripheral wall of the steam supply pipe.

(7) The apparatus for producing a skin-covered foamed molded article described in the above (5), in which the protrusion height (a) of the protruding portion formed by protrusion from the inner surface of the mold cavity to the inner side of the mold cavity is 1 to 5 mm.

Note that, in the specification, the "skin-covered foamed molded article" may be also simply referred to as a "foamed molded article" and the "hollow molded body" may be also referred to as a "skin". Further, the "hole for inserting a steam supply pipe" may be also referred to as a "steam feeding hole" or "steam hole".

According to the production method of the invention, for blow-molding a parison in a mold, the parison is in contact with the protruding portion which is formed by protrusion from inner surface of the mold cavity to inside of the cavity, to form a recessed portion having a shape corresponding to the shape of the protruding portion in the inward direction of the hollow molded body. By forming the recessed portion, a resin in a region for forming a steam hole in the hollow molded body is stretched, and thus a shape ready for easy formation of the steam hole is formed. Further, by inserting the steam supply pipe through the recessed portion and inserting the steam supply pipe into the hollow molded body, the recessed portion can be easily cut, and therefore it becomes possible to form conveniently a steam hole in good state.

In this regard, when a steam hole is made in a hollow molded body, there cannot be a case in which a resin of the hollow molded body for forming a recessed portion is adhered on peripheral wall of the steam supply pipe or clogs slits (that is, fine holes or small holes which a steam can pass) formed on the peripheral wall of a steam supply pipe, which are an entrance/exit for steam. Thus, it becomes possible to perform efficiently the steam supply for a short period of time, and thus, even when a molding cycle is short, a skin-covered foamed molded article, in which expanded beads are sufficiently fusion bonded to each other and adhesion between the expanded beads and skin is excellent, can be obtained.

Further, in the case of a conventional method using a steam pin, a long steam pin is needed to ensure an entrance/exit for steam, in consideration of clogging slits or small holes formed on the peripheral wall of the steam pin, which are an entrance/exit for steam. Thus, for example, the supplying of steam by inserting a steam pin in thickness direction of a foamed molded article with plate shape may be difficult when thickness of a foamed molded article and length of the steam pin are considered. Further, when a long steam pin is used, a problem associated with strength of steam pin may occur. Thus, the steam pin with only limited length can be used, and thus even when steam is supplied by inserting a steam pin in the width direction of a plate (that is, lateral direction), only limited shapes can be produced.

According to the production method of the invention, the steam hole can be made in good state, and thus even when the steam supply pipe is short, steam can be supplied efficiently. As a result, for example, for a skin-covered foamed molded article having plate shape, a steam hole can be formed in thickness direction of a plate which is as thin as the molded body and steam can be supplied via the steam hole. As a result, there can be more freedom for designing a spot for forming a steam hole in a hollow molded body.

Further, according to the production method of the invention, the skin is very thinly puckered around the steam hole to form a pleated resin portion, thus sealing the surroundings of the steam hole. As a result, steam leakage is effectively prevented, and therefore more efficient molding can be achieved.

Thus, even when it is desired to produce a large skin-covered foamed molded article which has plate shape with relatively thin thickness or a skin-covered foamed molded article with complex shape, steam can be evenly supplied into a hollow molded body, and thus not only the expanded beads filled in the hollow molded body can be easily fusion bonded to each other, but also fusion bonding property between the skin and expanded beads can be improved.

According to the production method of the invention, time required for forming a steam hole in the hollow molded body or time required for performing steam supply can be shortened, and as a result, the overall molding cycle can be shortened and productivity can be improved. Further, as there is more freedom for designing a spot for forming a steam hole, the designing property of a skin-covered foamed molded article can be improved.

An apparatus for producing a skin-covered foamed molded article of the invention comprises a mold cavity for forming a hollow molded body by blow molding a parison in softened state and a steam supply pipe for supplying steam, in which in the inner surface of the mold cavity, a protruding portion is formed by protrusion from the inner surface of the mold cavity to inside of the cavity, the protruding portion is formed by an outer pipe covering the steam supply pipe, and the steam supply pipe is provided along inner side of the outer pipe such that it can protrude from the tip of the outer pipe into the mold cavity. Accordingly, by using the apparatus for producing a skin-covered foamed molded article of the invention, a method of producing with good productivity the skin-covered foamed molded article having good fusion bonding between the expanded beads and good fusion bonding between the expanded beads and skin can be provided (herein below, the steam supply pipe may be also referred to as an inner pipe relative to the outer pipe).

The present invention is useful for producing a skin-covered foamed molded article, in which the resin constituting a skin formed of a hollow molded body, which is formed by blow molding, in a mold cavity, a parison in softened state as formed by extruding a thermoplastic resin in a molten state from an extruder, is a polyolefin resin having high stretchability in softened state.

BRIEF DESCRIPTION OF DRAWINGS

FIGS. 3A and 3B are diagrams illustrating an example of alignment of the steam supply pipe, the rim part of protruding portion which protrudes into a mold cavity, and the hollow molded body having steam holes that are related to the invention. Specifically, it is a partial enlargement for illustrating the lengthwise cross-sectional view when tip of the steam supply pipe, which has been formed to pass through along the inner side of the outer pipe forming the protruding portion, has a shape of recessed shape (that is, inverted cone shape). That is.

FIGS. 4A and 4B are diagrams illustrating another example of alignment of the steam supply pipe, the rim part of protruding portion which protrudes into a mold cavity, and the hollow molded body having steam holes that are related to the invention. Specifically, it is a partial enlargement for illustrating the lengthwise cross-sectional view when tip of the steam supply pipe, which has been formed to pass through along the inner side of the outer pipe forming the protruding portion, has a pointed shape (that is, protruded shape). That is.

FIG. 6A to FIG. 6H are schematic diagrams (partial view) illustrating the tip of the steam supply pipe of the invention.

FIGS. 6B, 6D, 6F and 6H each are a cross-sectional view of FIGS. 6A, 6B, 6C, and 6D along line A-A.

DETAILED DESCRIPTION

The method of the invention is a method for producing a skin-covered foamed molded article comprising blow molding a parison in a mold cavity to form a hollow molded body having a shape corresponding to the shape of the mold cavity, in which the parison is in softened state as formed by extruding a molten thermoplastic resin using an extruder, filling the thermoplastic resin expanded beads in the hollow molded body, and heating and fusion bonding the expanded beads by supplying steam via a steam supply pipe inserted into the hollow molded body, in which, for blow molding the parison in softened state in a mold, the parison is in contact with a protruding portion to form a recessed portion having a shape corresponding to the shape of protruding portion of the hollow molded body, the protruding portion is formed by protrusion from inner surface of the mold cavity to inside of the cavity, a steam hole for inserting a steam supply pipe is formed in the recessed portion, a steam supply pipe is inserted into the hollow molded body, and the expanded beads are heated and fusion bonded by supplying steam from the steam supply pipe inserted into the hollow molded body followed by cooling and releasing them to mold the skin-covered foamed molded article.

According to the invention, the resin for constituting a hollow molded body to be a skin is a thermoplastic resin. Specific examples of the resin include a polyolefin resin such as low density polyethylene (LDPE), high density polyethylene (HDPE), linear type low density polyethylene (LLDPE), polypropylene (propylene homopolymer: h-PP), propylene-ethylene random copolymer (r-PP), and propylene-ethylene block copolymer (b-PP); a polystyrene-based resin such as polystyrene (styrene homopolymer: GPPS), high impact polystyrene (HIPS), styrene-methyl methacrylate copolymer (MS), acrylonitrile-styrene copolymer (AS), polystyrene modified polyphenylene ether (modified PPE), and acrylonitrile-styrene-butadiene copolymer (ABS); a polyester-based resin such as polyethylene terephthalate (PET), polybutylene terephthalate (PBT), and polylactic acid (PLA); a polycarbonate resin such as bisphenol type polycarbonate (PC); and a mixture thereof.

Among the thermoplastic resins described above, the polyolefin resin is particularly preferable. The polyolefin resin contains the structural units of olefin component in an amount of 50 mol % or more, preferably 60 mol % or more, and more preferably 80 mol % or more in the resin. Examples of the polyolefin resin include a homopolymer of olefin, a copolymer of only olefin components, a copolymer of an olefin component and other monomer component which can be copolymerized with the olefin (that is, those satisfying the aforementioned amount of structural units of olefin component), and a mixture of an olefin polymer and other polymer (that is, those satisfying the aforementioned amount of structural units of olefin component in the mixture). Further, examples of other polymer which can be admixed with the olefin polymer include a thermoplastic elastomer such as styrene-butadiene-styrene block copolymer, a thermoplastic elastomer, ethylene-propylene rubber, and a polystyrene resin.

As for the polyolefin resin, from the view point of mechanical properties such as heat resistance and strength, a polyolefin resin containing at least 50% by weight or more high density polyethylene resin or polypropylene resin is preferable. In particular, a resin containing the polypropylene resin as a main component is more preferable. When the polypropylene resin is contained as a main component, the resin can be easily stretched when a steam hole is made in a hollow molded body, and thus it may be more difficult to form a steam hole. However, according to the production method of the invention, the steam hole can be easily made by forming the recessed portion even for a case in which the resin constituting the hollow molded body is a polyolefin resin which has high stretchability in softened state. Accordingly, it becomes possible to significantly shorten the molding cycle time.

Further, from the view point of blow molding property, a resin having melting point of 120 to 170° C. and melt flow index (MFR) of 0.1 to 10 g/10 min is preferably used as a polyolefin resin. For the polypropylene resin, measurement of melt flow index (MFR) is carried out according to the test condition M of JIS K7210 (1999) (temperature of 230° C., and load of 21.18 N). For the polyethylene resin, measurement of melt flow index (MFR) is carried out according to the test condition D of JIS K7210 (1999) (temperature of 190° C., and load of 21.18 N).

It is possible to add various additives to the thermoplastic resin for forming the hollow molded body. Examples of the additives include a conductivity imparting agent, an anti-oxidation agent, a heat stabilizing agent, an anti-weather agent, a anti-ultraviolet, a flame retardant, an inorganic filler, an anti-microbial agent, a electromagnetic shielding agent, a gas barrier agent, an anti-static agent, and the like. The additives are added in an amount within a range in which the purpose and effect thereof can be exhibited. Specifically, the addition amount is, with reference to 100 parts by weight of the thermoplastic resin, generally 10 parts by weight or less, preferably 5 parts by weight or less, and more preferably 3 parts by weight or less.

The resin constituting the expanded beads of the invention is preferably the same kind of the resin as the thermoplastic resin constituting a skin. In such case, good adhesion between the expanded beads and the thermoplastic resin of a hollow molded body, which forms the skin, is obtained, and a skin-covered foamed molded article with high strength such as bending strength is obtained. From this point of view, the resin constituting the expanded beads is preferably the same type of the resin or exactly the same resin as the thermoplastic resin used for forming the hollow molded body as a skin.

The apparent density of the expanded beads that are filled within the hollow molded body is not specifically limited. However, expanded beads with apparent density of 0.018 to 0.3 g/cm$^3$ as generally used are preferably used. Further, from the view point of easy control of secondary foaming performance caused by steam, apparent density of the expanded beads is preferably 0.022 to 0.15 g/cm$^3$.

The expanded beads may be produced by the known method customarily employed for preparing such expanded beads. For example, the expanded beads may be produced by a method which includes dispersing resin beads (or resin particles) in a predetermined amount of dispersion medium (in general, water), which may optionally contain a surface active agent as desired, contained in a vessel capable of being pressurized, such as an autoclave, feeding a blowing agent to the autoclave under pressure with stirring and with heating so that the resin beads are impregnated with the blowing agent, and, after maintaining the dispersion for a given period of time, discharging the resin beads impregnated with the blowing agent together with the dispersion medium from the vessel maintained at a high temperature and a high pressure to a lower pressure environment (in general, atmospheric pressure) to obtain the expanded beads.

The method for producing a skin-covered foamed molded article according to the invention can be explained in detail as follows. By placing a parison in a mold cavity for molding, in which the parison is in softened state formed by extruding a thermoplastic resin in molten state using an extruder, closing the mold, and performing blow molding by injecting pressurized gas (in general, air) into the parison via a pipe for introducing blow gas, a hollow molded body in which the outer surface of the hollow molded body is in contact with the inner surface of the mold cavity is formed.

For molding a hollow molded body by introducing pressurized gas (in general, air) into the parison in softened state, when the space between the outer surface of the parison and the inner surface of the mold cavity is de-pressurized to mold a hollow molded body, it becomes easier to obtain a hollow molded body having the shape corresponding to the shape of the mold cavity, and therefore desirable.

According to the production method of the invention, for blow molding a parison, for blowing molding a parison by protruding portion that is formed by protrusion from inner surface of the mold cavity to inside of the cavity, the parison is in contact with the protruding portion in mold cavity for blow molding, and therefore a recessed portion with shape corresponding to the shape of the protruding portion is formed in the inward direction of the hollow molded body.

In the mold cavity, an outer pipe 40 with cylinder shape for forming a protruding portion 41, which protrudes from an inner surface 2 of the mold cavity to inside of the cavity, and a steam supply pipe (herein below, it may be also referred to as an inner pipe relative to an outer pipe) 42 which is provided along the inner side of the outer pipe such that it can be inserted and pass through the recessed portion of the hollow molded body are formed as a dual-pipe structure. For example, as exemplified in FIGS. 3 and 4, inside the pipe of the outer pipe 40 with cylinder shape, the empty pipe-type inner pipe 42 having closed tip is provided to pass through the cylinder of the outer pipe 40 and protrude from the protruding portion 41 such that it can be inserted and pass through toward the hollow molded body.

Figure 3A:
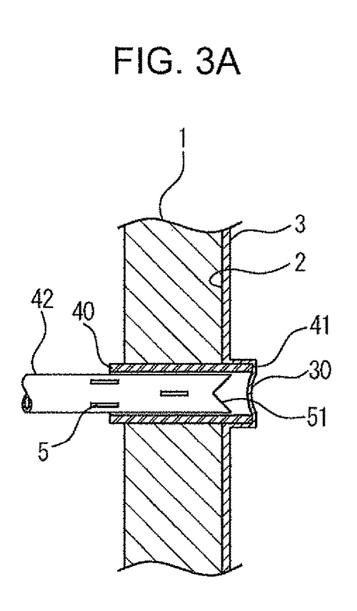
FIG. 3A is a schematic diagram illustrating the state of the recessed portion of a hollow molded body which has been formed in a mold cavity and FIG. 3B is a schematic diagram illustrating the state in which the steam supply pipe is inserted into the hollow molded body after forming a steam hole.
Figure 4A:
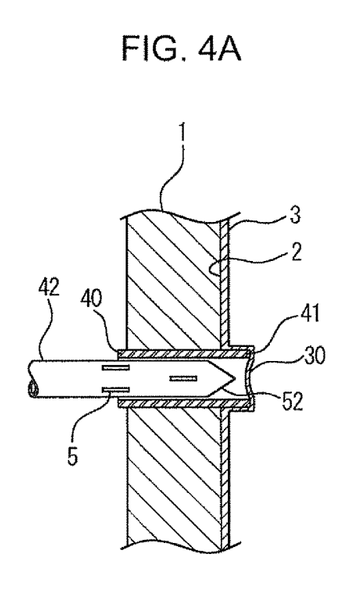
FIG. 4A is a schematic diagram illustrating the state of the recessed portion of a hollow molded body which has been formed in a mold cavity and FIG. 4B is a schematic diagram illustrating the state in which the steam supply pipe is inserted into the hollow molded body after forming a steam hole.

According to the invention, outer surface (that is, mold side) of the parison placed in the mold cavity is in contact with the protruding portion 41 which protrudes into the mold cavity, and as a result, the recessed portion 30 having a shape corresponding to the shape of the protruding portion 41 is formed in the inward direction of the hollow molded body 3. Such states are diagrammatically illustrated in FIGS. 3A and 4A. Note that, in FIGS. 3A and 4A, the bottom part of the recessed portion 30 is slightly sunken in the inward direction of the cylinder of the outer pipe, as illustrated in FIGS. 3A and 4A. Further, as shown FIGS. 3A and 4A, although it illustrates a state in which the resin (that is, hollow molded body) for forming the recessed portion is in close contact with the rim part of the protruding portion, it is not necessary to have completely close contact. Instead, it is only required to have a shape in which it is sunken in the inward direction of the parison than the periphery of the hollow molded body in which the recessed portion is formed.

With regard to the recessed portion represented by 30 formed on the hollow molded body 3, by protruding a steam supply pipe 42 from the protruding portion, cut pieces 31 and 32 are punched to form a steam hole. After that, a steam supply pipe is inserted and passed through the recessed portion (as shown FIGS. 3B and 4B). The steam supply pipe 42 is inserted with pre-determined length into the hollow molded body, and as a result, steam is supplied from the steam supply pipe 42.

For blow molding, when the recessed portion 30 is formed with pressurized gas introduced into the parison, the parison in softened state for forming the recessed portion 30 is stretched while being in contact with the protruding portion 41, forming a shape suitable for having a steam hole. Thus, when a steam hole is made on the recessed portion 30 by protruding the steam supply pipe 42 of the inner pipe, a cut can be easily made at a region at which the recessed portion 30 is in contact with the protruding portion 41, and thus steam hole can be easily formed. Note that, for a case in which no recessed portion is formed, it is difficult to form a steam hole, and thus there may be a problem like adhesion of the resin, which forms the hollow molded body, in a film shape onto the peripheral wall of the steam pipe. As a result, steam supply may be hampered and it may be difficult to shorten the molding cycle.

The cut pieces 31 and 32, which are a part of the recessed portion represented by 30 formed as a result of cut when a steam hole is formed on the recessed portion 30 by protruding the steam supply pipe 42, remain inside the hollow molded body and fixed by fusion bonding with the expanded beads, for example.

Figure 3B:
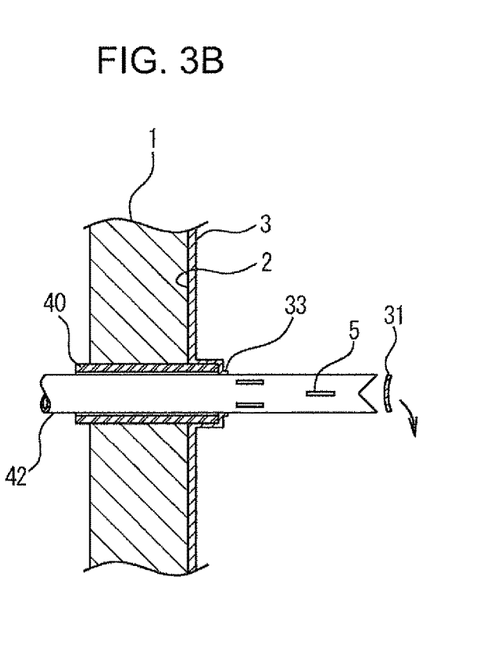
Figure 4B:
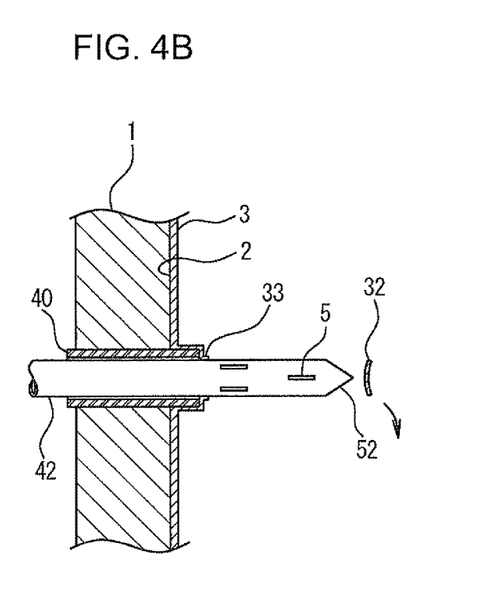
Figure 5:
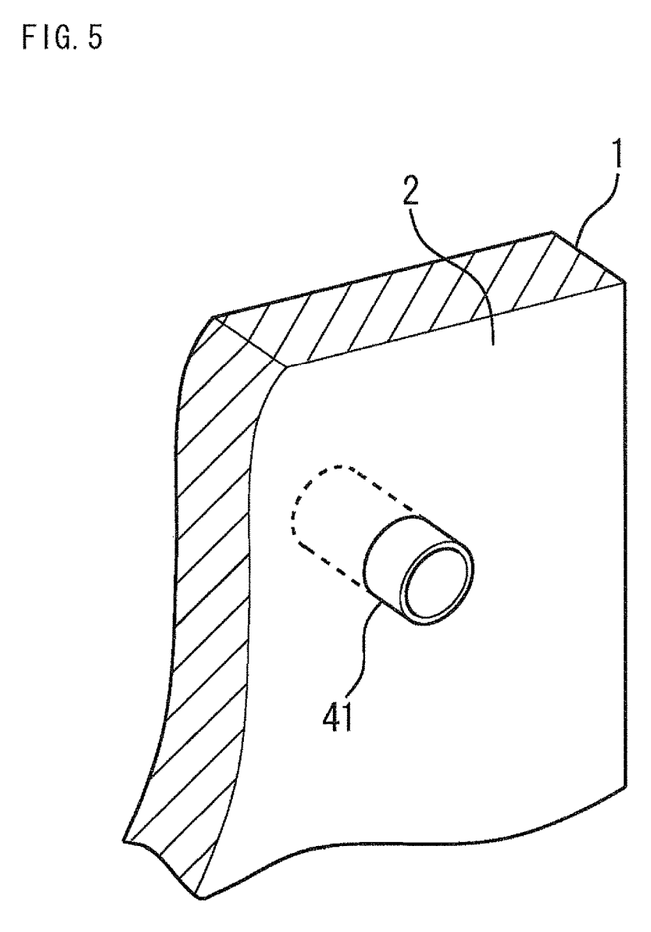
FIG. 5 is a partially enlarged perspective view diagrammatically illustrating the protruding portion which is aligned to be protruded into the mold cavity.

Note that, when a steam hole is formed, the skin near the steam hole is slightly puckered as a steam supply pipe is inserted and passes through the recessed portion, molding a resin portion with puckered and pleated shape (illustrated as 33 in FIGS. 3B and 4B). Such resin portion with pleated shape functions as a sealing part for effective prevention of steam leakage from the steam hole when steam is supplied from the steam supply pipe. Further, as a result of effective prevention of steam leakage, more efficient molding can be achieved. The resin portion can be more easily formed by using an apparatus for production having a double pipe structure consisting of an outer pipe for covering the steam supply pipe and an inner pipe as a steam supply pipe.

Protrusion height (a) of the protruding portion 41 (length from the inner surface of the mold cavity to the tip of protruding portion), that is formed by protruding into the mold cavity, is designed in consideration of thickness (skin thickness) Y of a desired hollow molded body or the like. In general, (a) is preferably 0.5 to 8 mm or so. When the protrusion height (a) of the protruding portion 41 is too small, the recessed portion to be formed in the hollow molded body is formed in insufficient state, and as a result it is difficult to form a steam hole and desired purpose may not be achieved. On the other hand, when the protrusion height (a) of the protruding portion 41 is too big, the parison in softened state may be broken when a recessed portion is formed in a hollow molded body or thickness around the recessed portion becomes too thin, and thus the strength of the rim part of steam hole may be deteriorated. From such point of view, the protrusion height (a) of the protruding portion 41 is more preferably within the range of 1 to 5 mm.

Forming the recessed portion 30 or state of steam hole is related not only to the protrusion height (a) of the protruding portion 41 but also to the thickness of the hollow molded body, that is, skin thickness Y of the skin-covered foamed molded article. For example, when the skin thickness is thin, the skin may be easily broken during formation of the recessed portion 30, and thus the protrusion length of the protruding portion 41 is preferably adjusted to be short. Specifically, the ratio (a/Y) between the protrusion height (a) of the protruding portion 41 and the skin thickness Y is preferably from 0.3 to 5. More preferably, it is from 0.4 to 3.

The protruding portion of the invention is formed by the outer pipe 40 covering the steam supply pipe, which protrudes from the inner surface of the mold cavity to inside of the cavity. Inner diameter of the outer pipe 40 for forming the protruding portion 41, which protrudes into the mold cavity, may vary depending on the outer diameter of the inner pipe. In generally, it is preferably from 5 to 15 mm, and more preferably from 6 to 14 mm. Further, although the outer pipe may vary depending on materials, when the outer pipe is made of a metal, the thickness of the outer pipe is preferably from 0.2 to 2.0 mm from the view point of strength.

Figure 6A:
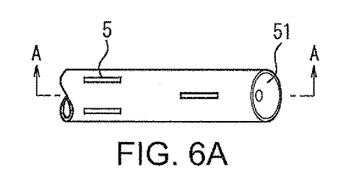
FIG. 6A and FIG. 6B are diagrams illustrating an example of a steam supply pipe having recess-shaped tip (that is, invert cone shape).
Figure 6B:
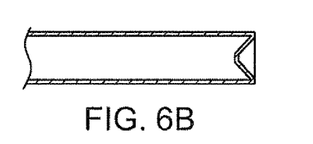
Figure 6C:
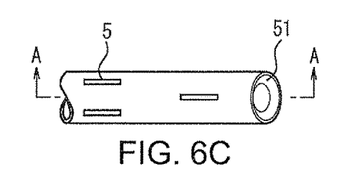
FIG. 6C and FIG. 6D are diagrams illustrating another example of a steam supply pipe having recess-shaped tip.
Figure 6D:
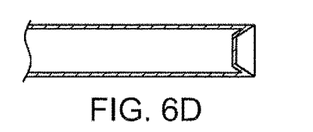

According to the invention, the steam supply pipe 42 protrudes from the protruding portion 41 and punches through a thin skin region of the recessed portion 30 so that a steam hole can be formed. Shape of the tip of the steam supply pipe 42 is not specifically limited, as long as it can punch through the recessed portion 30. Examples thereof include a sunken shape with the recessed form 51 illustrated in FIGS. 6A and 6C, a protruded shape protruded in a point-shape 52 illustrated in FIG. 6E, and a flat shape 53 illustrated in FIG. 6G.

When the tip has a sunken shape in recessed form or a flat shape, the steam supply pipe 42 is cut in the recessed portion by the rim part which is at peak of the tip of the steam supply pipe. As a result, the recessed portion is easily punched, and thus forming a hole for inserting the steam supply pipe can be more easily performed.

The steam supply pipe 42 is a cylinder body having empty inside and closed tip. Further, on the peripheral wall of the steam supply pipe 42, a plurality of slits or small holes 5 (herein below, referred to as slits) for supplying steam are formed. When steam is supplied to the hollow molded body via the slits, the expanded beads are fusion bonded to each other. The outer diameter of the slit is smaller than the particle diameter of the expanded beads. Further, the slit width is narrower than the particle diameter of the expanded beads.

According to the invention, structure of the steam supply pipe and protruding portion is preferably formed to have a double pipe structure including an outer pipe for covering the steam supply pipe and an inner pipe as a steam supply pipe. Outer diameter of the inner pipe is related to the inner diameter of the outer pipe. However, in general, it is preferably from 4 to 15 mm, and more preferably from 5 to 13 mm from the view point of easy control of supply or discharge of steam. Further, although the inner pipe may vary depending on materials, when the inner pipe is made of a metal, the thickness of the inner pipe needs to be about 0.5 mm or more from the view point of the strength required for molding.

After forming a steam hole by protruding an inner pipe as a steam supply pipe from the protruding portion 41 and inserting the steam supply pipe into the hollow molded body, steam supply is performed. The insertion length of the steam supply pipe into the hollow molded body, that is, the insertion length b from the tip of the steam supply pipe 42 to the inner surface of the mold cavity when the steam supply pipe 42 is inserted into the hollow molded body, may vary depending on shape or thickness of a desired skin-covered foamed molded article. However, when a skin-covered foamed molded article has a plate shape, it is from 10 to 50 mm in the thickness direction of the plate. When it is within the range, it is possible to obtain a favorable skin-covered foamed molded article even when steam is supplied.

Note that, according to the invention, in case that the steam supply pipe and protruding portion are formed with a double pipe structure having the outer pipe 40 and the inner pipe 42, it is preferable that the inner pipe 42 remains in stored state within the outer pipe when the recessed portion is formed in the hollow molded body by blow molding. Further, regarding the positional relation between the inner pipe and the outer pipe at the time of blow molding, it is preferable that the inner pipe is placed such that it is slightly behind the tip of the outer pipe. According to such placement, the hollow molded body around the recessed portion 30 can be easily stretched, allowing easier formation of steam hole. From this point of view, at the time of blow molding, it is preferable to form the recessed portion 30 such that the inner pipe is about 1.0 to 5.0 mm behind the tip of the outer pipe. More preferably, it is about 1.0 to 4.0 mm behind the tip of the outer pipe.

Figure 1:
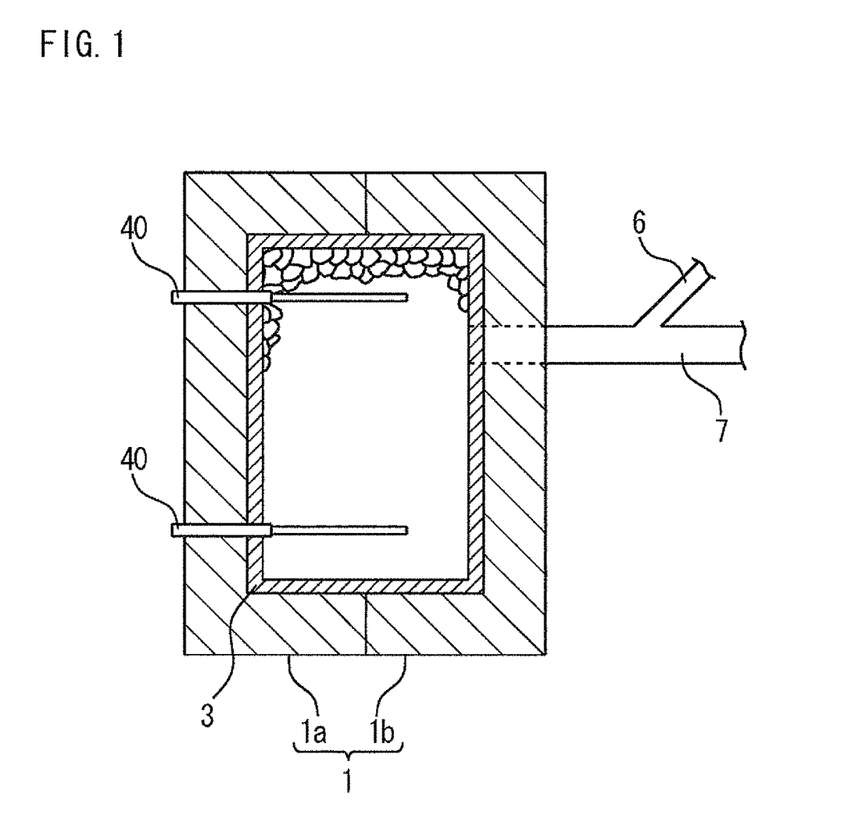
FIG. 1 is a lengthwise cross-sectional view diagrammatically illustrating an example of an apparatus for producing a skin-covered foamed molded article.
Figure 2:
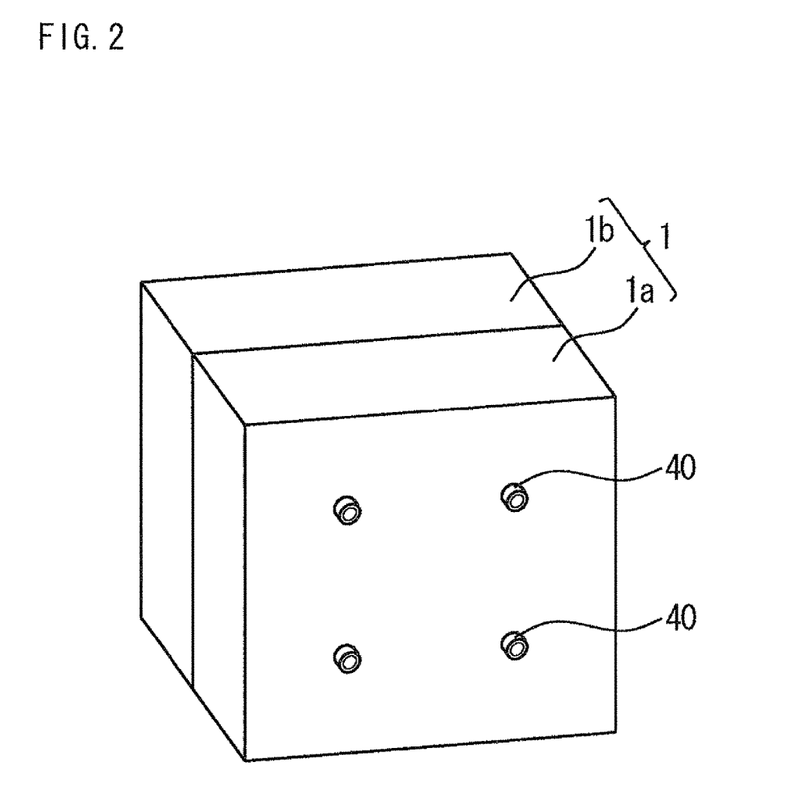
FIG. 2 is a diagram illustrating an example of alignment of the steam supply pipe of the invention relative to a mold.

Filling of the expanded beads in the hollow molded body can be achieved, before cooling and solidification of the hollow molded body in softened body, from a pipe 7 for filling expanded beads together with the pressurized air from an air supply pipe 6 (FIG. 1). Meanwhile, the reason for filling the expanded beads while the hollow molded body is still in softened state is due to the fact that, when the expanded beads are filled after the hollow molded body is cooled and solidified, a long steam supply time is needed to form a skin-covered foamed molded article by fusion bonding of the expanded beads in accordance with steam supply, and thus the productivity may be lowered or the fusion bonding between the inner surface of the hollow molded body as a skin and the expanded beads may become insufficient.

According to the method of the invention, the gas (air is generally used) introduced into the parison for blow molding of parison in softened state is, although may vary depending on shape of a desired molded article or fluidity of a parison resin, introduced as pressurized gas such that the inlet pressure into the parison is 0.5 MPa or so. Further, the temperature condition of the mold is preferably 60 to 100° C. Note that, the parison with tubular shape or ring shape is generally used.

The vapor pressure of the steam supplied to the hollow molded body that is used for the production method of the invention is preferably 0.15 to 0.6 MPa (G). More preferably it is preferably 0.18 to 0.5 MPa (G).

According to the method of the invention, the steam supply pipe to be inserted into the hollow molded body can be used not only for supply of steam but also for discharge of steam, and a plurality of steam supply pipes are used. As a method of heating, any method including a one way heating method by which the steam supply side and discharge side are fixed and the heating is carried out only at one side or an alternate heating method by which steam heating is performed while one side is taken as supply side and the other side is taken as discharge side and then the steam heating is performed after alternating the supply side and the discharge side can be employed. Of these, to obtain stronger fusion bonding between expanded beads, the alternate heating method is preferable.

According to the production method of the invention, steam supply can be efficiently performed even when a short steam supply pipe is used. For example, in case of plate-shaped foamed molded articles, a steam hole is formed in the thickness direction of the plate, a steam supply pipe is inserted, and steam is introduced, and the expanded beads are efficiently fusion bonded, and therefore a favorable foamed molded article can be obtained. Accordingly, even for a large size and plate-like molded article in which product thickness of a skin-covered foamed molded article is relatively thin like 10 to 50 mm, a plurality of steam holes can be formed in a flat region and a steam supply pipe is inserted to the hole to supply steam. Further, as the steam is evenly distributed over entire expanded beads, the expanded beads can be fusion bonded well to each other, making it possible to obtain efficiently a favorable foamed molded article.

Further, the apparatus for producing a skin-covered foamed molded article of the invention is an apparatus for producing a skin-covered foamed molded article, which includes a mold for forming a hollow molded body by blow molding of a parison in softened state, a steam supply pipe for supplying steam, and an outer pipe for covering the steam supply pipe, in which tip of the outer pipe protrudes from the inner surface of the mold into the mold cavity and the steam supply pipe is formed along inner side of the outer pipe such that it can protrude from the tip of the outer pipe into the mold cavity. In particular, the aforementioned apparatus for production is useful for forming a recessed portion in hollow molded body as described before. Thus, the steam supply pipe can be easily inserted into the hollow molded body and steam supply can be performed efficiently, and therefore the apparatus is also preferable to be used for the method of producing a skin-covered foamed molded article of the invention.

EXAMPLES

Herein below, the invention is explained in view of the examples, but the invention is not limited to them.

Meanwhile, the resins used in Examples and Comparative Examples are described in Table 1,

TABLE 1

| Abbreviation | Type | Manufacturer | Product Number | MFR (230° C., 21.18N) |
|---|---|---|---|---|
| PP[1] | Polypropylene-based resin | Japan Polypropylene Corporation | NOVATEC EC9 | 0.5 g/10 min |
| TPO | Polyolefin-based thermoplastic elastomer | Sumitomo Chemical Company, Limited | ESPOLEX 820 | 0.5 g/10 min |
| PE | Polyethylene resin | Japan Polyethylene Corporation | NOVATEC HD HB332R | 0.3 g/10 min |

Example 1

To an extruder with inner diameter of 65 mm, a polypropylene resin (trade name: NOVATEC, manufactured by Japan Polypropylene Corporation, grade: EC9, Melt Flow index (MFR): 0.5 g/10 min (measurement condition: 230° C., 21.18 N)) was added, and heated and kneaded at 220° C. to produce a resin in molten state. Next, the resin in molten state was filled in an accumulator adjusted to 220° C., which is attached to the extruder. Subsequently, the molten resin was extruded from a die with slit interval of 2.2 mm and the parison in softened state is placed in a flat divided-type mold having protruding portions in cavity as described in Table 2 that is provided right beneath the die. After that, the mold was clamped.

Subsequently, while pressurized blowing air of 0.50 MPa to be introduced into the parison via a hole for introducing blow gas, a gap between the outer surface of the parison and the inner surface of the mold was de-pressurized simultaneously for molding a hollow molded body which has a shape corresponding to the shape of the mold cavity. As for the mold for molding, an apparatus for producing a skin-covered foamed molded article which includes an outer pipe (that is, steel pipe with outer diameter of 10 mmϕ and inner diameter of 8.4 mmϕ for forming a protruding portion (protrusion height (a)) which protrudes into the mold cavity and an inner pipe which is operably formed along the inner side of the outer pipe and functions as a steam supply pipe was used.

Further, for molding a hollow molded body by blow molding of a parison in softened state, by allowing the outer surface of the parison to abut on the protruding portion which protrudes into the mold cavity, a recessed portion which protrudes in the inward direction of the hollow molded body and has a shape corresponding to the shape of the protruding portion was formed. Note that, the steam supply pipe and protruding portion of the outer pipe were placed evenly on four spots on one plane which is formed to have width and length of the mold plate. Thus, the steam holes are formed on only one plane which is formed to have width and length of the plate. Further, the inner pipe (that is, steam supply pipe) is designed to be inserted in the thickness direction of the foamed molded article with plate shape. Molding of the hollow molded body was performed at the mold temperature of 70° C. Note that, for blow molding, with respect to the outer pipe, the inner pipe was placed 2 mm behind the tip of the outer pipe.

After forming the hollow molded body, the inner pipe (that is, steel pipe with outer diameter of 8.0 mmϕ and inner diameter of 6.0 mmϕ having a plurality of slits formed on the peripheral wall and inverted sinker shape with recessed tip, and a gap of 0.2 mm or so is formed between the outer pipe and the inner pipe) as the steam supply pipe which has been formed to pass through along the inner side of the outer pipe was protruded from the outer pipe to form a steam hole in the recessed portion formed in the hollow molded body. In addition, the inner pipe was inserted into the hollow molded body with the insertion length (b) mm as described in Table 2.

Subsequently, expanded beads consisting of a polypropylene resin with apparent density of 0.043 g/cm$^3$ were filled in the hollow molded body in softened state. Meanwhile, for filling with the expanded beads, the gas present inside the hollow molded body was discharged via the slits formed on the peripheral wall of the inner pipe inserted into the hollow molded body, while the pressure inside the hollow molded body is being controlled.

After finishing the filling with the expanded beads, while steam was suctioned via two inner pipes among the four inner pipes inserted into the hollow molded body, steam with steam pressure (0.32 MPa (G)) illustrated in Table 2 was supplied for 8 seconds through remaining two steam pipes. Next, while carrying out suctioning via the two steam supply pipes which have been supplying steam, steam with steam pressure of 0.32 MPa (G) was supplied for 8 seconds through other two steam pipes which have been suctioning the steam. Next, from all steam supply pipes, steam with steam pressure of 0.32 MPa (G) was supplied for 5 seconds so that the expanded beads present inside the hollow molded body are fusion bonded to each other by heating and also the inner surface of the hollow molded body and the expanded beads are fusion bonded. After cooling, once the mold surface pressure became 0.02 MPa (G), the mold was open to give a desired skin-covered foamed molded article. Physical properties or the like of the foamed molded article obtained are listed in Table 2.

Example 2

A flat divided-type mold having a size of 400 mm×250 mm×25 mm (length×width×thickness) was used. A skin-covered foamed molded article was obtained in the same manner as Example 1 except that the condition described in Table 2 was followed. Characteristics of the foamed molded article obtained are listed in Table 2.

Example 3

The outer pipe had outer diameter of 8.0 mmϕ and inner diameter of 6.4 mmϕ while the inner pipe had outer diameter of 6.0 mmϕ and inner diameter of 4.0 mmϕ. Further, the mold temperature at the time of molding the hollow molded body was 80° C. Except those, a skin-covered foamed molded article was obtained in the same manner as Example 1. Characteristics of the foamed molded article obtained are listed in Table 2.

Example 4

As a die for forming a hollow molded body, a die with lip interval of 4.2 mm was used. Then, a skin-covered foamed molded article was obtained in the same manner as Example 1 except that the condition described in Table 2 was followed. Characteristics of the foamed molded article obtained are listed in Table 2.

Example 5

Figure 6E:
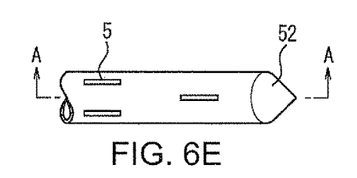
FIG. 6E and FIG. 6F are diagrams illustrating an example of a steam supply pipe having point-shaped tip (that is, protruded shape).
Figure 6F:
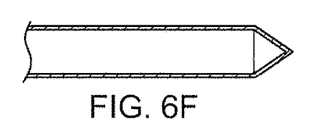

An inner pipe (outer diameter of 8 mmϕ and inner diameter of 6.0 mmϕ) having a cone-shaped tip as illustrated in FIG. 6E was used to form a steam supply pipe. Then, a skin-covered foamed molded article was obtained in the same manner as Example 1 except that the condition described in Table 2 was followed. Characteristics of the foamed molded article obtained are listed in Table 2.

Example 6

Figure 6G:
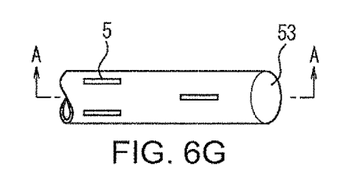
FIG. 6G and FIG. 6H are diagrams illustrating an example of a steam supply pipe having flat tip.
Figure 6H:
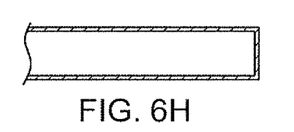

An inner pipe (outer diameter of 8 mmϕ and inner diameter of 6.0 mmϕ) having a flat-shaped tip as illustrated in FIG. 6G was used to form a steam supply pipe. Then, a skin-covered foamed molded article was obtained in the same manner as Example 1 except that the condition described in Table 2 was followed. Characteristics of the foamed molded article obtained are listed in Table 2.

Example 7

As a resin consisting the hollow molded body, a polyolefin resin (trade name: ESPOLEX, a polyolefin thermoplastic elastomer manufactured by Sumitomo Chemical Company Limited, grade: 820, Melt Flow index (MFR): 0.5 g/10 min (measurement condition: 230° C., 21.18 N)) was used. Then, a skin-covered foamed molded article was obtained in the same manner as Example 1 except that the condition described in Table 2 was followed. Characteristics of the foamed molded article obtained are listed in Table 2.

Example 8

As a resin consisting the hollow molded body, a polyethylene-based resin (trade name: NOVATEC HD, manufactured by Japan Polyethylene Corporation, grade: HB332R, Melt Flow index (MFR): 0.3 g/10 min (measurement condition: 230° C., 21.18 N)) was used and, as expanded beads, polyethylene-based resin expanded beads with apparent density of 0.05 g/cm$^3$ were used. Then, a skin-covered foamed molded article was obtained in the same manner as Example 1 by using the same mold as Example 1 except that the condition described in Table 2 was followed. Characteristics of the foamed molded article obtained are listed in Table 2.

Example 9

Except that the protrusion length of the protruding portion is 6 mm, the same mold as the one used in Example 1 was used. Characteristics of the foamed molded article obtained are listed in Table 2. Surface state near the steam hole area which is formed by forming a hole in the recessed portion of the hollow molded body exhibited some minor irregularities. However, there was absolutely no problem in fusion bonding property of the expanded beads and molding time.

Comparative Example 1

As a mold for molding, a mold equipped with steam pipes consisting of an outer pipe and an inner pipe without having any protruding portion in mold cavity was used to form a hollow molded body (that is, the resulting hollow molded body has no recessed portion corresponding to the protruding portion of the invention). Further, except that the condition described in Table 2 was followed, a skin-covered foamed molded article was obtained in the same manner as Example 1. However, when a steam hole is formed in the hollow molded body using an inner pipe of the steam pipe, a clean or clear steam hole was not formed. Thus, it was difficult to efficiently and quickly introduce steam into the hollow molded body. For such reasons, fusion bonding between the expanded beads was poor. Further, as irregularities are found on a surface near the steam hole area of the foamed molded article obtained, the surface was not smooth and was in poor state. Characteristics of the foamed molded article obtained are listed in Table 2.

Comparative Example 2

With regard to Comparative Example 1, molding was performed for an extended period of time for steam supply so that sufficient fusion bonding between expanded beads can occur. Except that the total molding time is extended, a skin-covered foamed molded article was obtained in the same manner as Comparative Example 1. According to the extended steam supply, a slight improvement in fusion bonding property between expanded beads was observed. However, similar to Comparative Example 1, as irregularities are found on a surface near the steam hole area of the foamed molded article obtained, the surface was in poor state. Characteristics of the foamed molded article obtained are listed in Table 2.

TABLE 2

| | | | Example 1 | Example 2 | Example 3 | Example 4 | Example 5 | Example 6 | Example 7 | Example 8 | Example 9 | Comp. Example 1 | Comp. Example 2 |
|---|---|---|---|---|---|---|---|---|---|---|---|---|---|
| Raw resin material | Skin | | PP1 | PP1 | PP1 | PP1 | PP1 | PP1 | TPO | PE | PP1 | PP1 | PP1 |
| | expanded bead | | PP | PP | PP | PP | PP | PP | PP | PE | PP | PP | PP |
| Mold | Shape of tip of steam supply pipe | — | Recessed shape | Recessed shape | Recessed shape | Recessed shape | Protruded shape | Flat shape | Recessed shape | Recessed shape | Recessed shape | Protruded shape | Protruded shape |
| | Insertion length of steam supply pipe (b) | (mm) | 35 | 20 | 15 | 35 | 35 | 35 | 35 | 35 | 35 | 35 | 35 |
| | Height of protruding portion (a) | (mm) | 2 | 2 | 2 | 3 | 2 | 2 | 3 | 2 | 6 | 0 | 0 |
| | Height of protruding portion (a)/ Skin thickness (Y) | — | 0.8 | 0.8 | 1.1 | 0.7 | 0.8 | 0.8 | 1.2 | 0.8 | 2.4 | — | — |
| | Mold shape (length) | (mm) | 400 | 400 | 400 | 400 | 400 | 400 | 400 | 400 | 400 | 400 | 400 |
| | (width) | (mm) | 250 | 250 | 250 | 250 | 250 | 250 | 250 | 250 | 250 | 250 | 250 |
| | (thickness) | (mm) | 40 | 25 | 20 | 40 | 40 | 40 | 40 | 40 | 40 | 40 | 40 |
| Molding condition | Steam pressure | (MPa) | 0.32 | 0.32 | 0.32 | 0.32 | 0.32 | 0.32 | 0.30 | 0.20 | 0.32 | 0.32 | 0.32 |
| | State of formed steam hole | — | excellent | excellent | good | excellent | excellent | excellent | excellent | excellent | good | bad | bad |
| | Molding cycle | (sec) | 210 | 200 | 190 | 230 | 215 | 210 | 215 | 230 | 210 | 210 | 240 |
| Product evaluation | Product thickness | (mm) | 40 | 25 | 20 | 40 | 40 | 40 | 40 | 40 | 40 | 40 | 40 |
| | Skin thickness (Y) | (mm) | 2.5 | 2.5 | 1.8 | 4.5 | 2.5 | 2.5 | 2.5 | 2.5 | 2.5 | 2.5 | 2.5 |
| | Fusion bonding property between expanded beads | — | good | good | good | good | good | good | good | good | good | bad | poor |

TABLE 2-continued

| | Example 1 | Example 2 | Example 3 | Example 4 | Example 5 | Example 6 | Example 7 | Example 8 | Example 9 | Comp. Example 1 | Comp. Example 2 |
|---|---|---|---|---|---|---|---|---|---|---|---|
| Fusion bonding property between skin and expanded beads | — | good | good | good | good | good | good | good | good | good | bad | poor |

[Skin Thickness]

Skin thickness of the skin-covered foamed molded article was measured as follows. A skin-covered foamed molded article obtained was cut longitudinally in the thickness direction thereof at three positions in total, and in the cross-section in each of the three cut positions, the skin thickness was measured at six positions which are equally spaced apart along the circumference direction of the skin (while avoiding a position where the skin-covered foamed molded article has a special shape). The arithmetic mean of the thus obtained eighteen thickness values is taken as the skin thickness.

[Apparent Density of Expanded Beads]

The apparent density of expanded beads was determined as follows. Specifically, a group of expanded beads (weight: W (g)) were immersed in water contained in a graduation cylinder. From the rise of the water level in the graduation cylinder after the expanded beads are settled on the bottom, a volume V (L) of the group of the expanded beads was measured. The apparent density of the expanded beads was determined by dividing the weight W of the group of the expanded beads by the volume V of the group of the expanded beads and obtained in terms of (W/V) unit.

[Molding Cycle]

It represents the total time span (seconds) from the clamping of a mold for molding of a hollow molded body to the releasing of a product after finishing the molding.

[Evaluation of State of Formed Steam Hole]

"excellent": Very thin pleat-shaped portions are formed near the steam hole.

"good": Although steam hole can be formed, some minor irregularities are found on the surface near steam hole.

"bad": A steam hole may not be formed, or although a penetrating hole for insertion can be formed, irregularities are found on the surface near steam hole area, surface state of the molded article is poor, and the resin is adhered onto the inner pipe.

[Evaluation of Fusion Bonding Property of Expanded Beads]

As a test specimen for evaluating fusion bonding property, the molded article was cut to have a size of 100 mm×100 mm×(thickness of the foamed molded article except the skin) at five positions in total including center part and four corners of the obtained plate-like skin-covered foamed molded article (except the corner tip; R part) and not including the skin. The test specimen was then fractured and halved, and for one hundred expanded beads or more exposed on the fractured surface, state of the beads on the fractured surface was observed with the naked eye, and the number of the expanded beads broken by themselves and the number of the expanded beads peeled at the interface with other expanded beads were counted. In addition, the ratio of the broken expanded beads compared to the total number of the broken expanded beads and the number of the expanded beads peeled at the interface with other expanded beads was calculated. The lowest value among the obtained ratios was taken as the fusion bonding ratio of the expanded beads. The evaluation was made based on the following criteria.

"good": Ratio of fusion bonding for expanded beads is 50% or more.

"poor": Ratio of fusion bonding for expanded beads is 10% or more and less than 50%.

"bad": Ratio of fusion bonding for expanded beads is less than 10%.

[Evaluation of Fusion Bonding Property Between Skin and Expanded Beads]

As a test specimen for evaluating fusion bonding property of the skin, a sample including the skin was cut to have a size of 100 mm×100 mm at five positions in total including center part and four corners of the obtained plate-like skin-covered foamed molded article (except the corner tip; R part). The skin was peeled from the test specimen, and for one hundred expanded beads or more exposed on the fractured surface, state of the expanded beads on the fractured surface was observed with the naked eye. Thereafter, the number of the broken expanded beads and the number of the expanded beads peeled at the interface between the broken expanded beads and the skin were counted. In addition, the ratio of the broken expanded beads compared to the total number of the broken expanded beads and the number of the expanded beads peeled at the interface between the broken expanded beads and the skin was calculated. The lowest value among the obtained ratios was taken as the fusion bonding ratio between the expanded beads and the skin. The evaluation was made based on the following criteria.

"good": Ratio of fusion bonding for skin is 50% or more.

"poor": Ratio of fusion bonding for skin is 10% or more and less than 50%.

"bad": Ratio of fusion bonding for skin is less than 10%.

REFERENCE SIGNS LIST

1 Mold for blow molding
2 Inner surface of mold cavity
3 Hollow molded body
30 Recessed portion
31, 32 Cut pieces from recessed portion
33 Pleat-shaped portion
40 Outer pipe
41 Protruding portion
42 Steam supply pipe (inner pipe)
5 Slit
51 Tip of steam supply pipe (recessed shape)
52 Tip of steam supply pipe (protruded shape)
53 Tip of steam supply pipe (flat shape)
6 Pipe for introducing pressurized air
7 Pipe for filling expanded beads

What is claimed is:

1. A method for producing a skin-covered foamed molded article, the method comprising:
    forming a parison by extruding a thermoplastic resin in a molten state using an extruder;
    placing the parison that is in a softened state into a mold cavity of a blow-molding mold, the mold comprising a protruding portion that protrudes from an inner surface of the mold cavity into the mold cavity;
    injecting pressurized gas via a blow gas pipe into the parison to form and expand a cavity in the parison;
    expanding the cavity of the parison with pressurized gas to contact an outer surface of the parison with the protruding portion, forming a hollow molded body having an outer wall in contact with and conforming to a shape defined by the inner surface of the mold cavity and the protruding portion; and then
    pushing a steam supply pipe to contact a distal end of the steam supply pipe with the outer surface of the outer wall of the hollow molded body at a recessed portion of the hollow molded body, wherein:
        the recessed portion is a portion of the outer wall of the hollow molded body that conforms to the shape defined by a tip of the protruding portion, the recessed portion including a portion curved inside the tip of the protruding portion in a direction opposite to the insertion direction of the steam supply pipe, and
        the steam supply pipe is a hollow cylinder body with a closed tip and the tip has a recessed shape or a flat shape, and a peripheral wall of the steam supply pipe has a plurality of slits for supplying steam and discharging steam; and then
    pushing the distal end of the steam supply pipe through the outer wall of the hollow molded body and into the cavity of the hollow molded body such that a piece of the hollow molded body is cut away and detached from the remainder of the hollow molded body, thus forming a steam supply pipe hole in the outer wall of the hollow molded body, and a portion of the outer wall surrounding the steam supply pipe hole has a pleated shape;
    inserting thermoplastic resin expanded beads into the cavity of the hollow molded body; and
    heating and fusion bonding the expanded beads by supplying steam and discharging steam via the steam supply pipe inserted into the cavity of the hollow molded body.

2. The method for producing a skin-covered foamed molded article according to claim 1, wherein:
    the protruding portion is formed by an outer pipe which covers the steam supply pipe,
    the steam supply pipe is provided along an inner side of the outer pipe such that it can be inserted and passed through the recessed portion of the hollow molded body, and
    an inner diameter of the outer pipe is from 5 mm to 15 mm.

3. The method for producing a skin-covered foamed molded article according to claim 1, wherein:
    the mold cavity is provided with a plurality of outer pipes,
    a plurality of steam supply pipes are provided, one each along an inner side of each of the plurality of the outer pipes, and
    a plurality of steam holes are formed in the hollow molded body by the plurality of steam supply pipes inserted to the holes to supply steam and discharging steam.

4. The method for producing a skin-covered foamed molded article according to claim 1, wherein:
    the mold cavity is provided with a plurality of outer pipes,
    a plurality of steam supply pipes are provided, one each along an inner side of each of the plurality of outer pipes, and
    while a first steam with steam pressure is supplied through slits of at least one of the plurality of steam supply pipes inserted into the hollow molded body, a second steam is suctioned via slits of at least one of the steam supply pipes except for the at least one of the plurality of the steam supply pipes supplying the first steam.

5. The method for producing a skin-covered foamed molded article according to claim 1, wherein the slit width is narrower than the particle diameter of the expanded beads.

* * * * *